(12) United States Patent
Adunka et al.

(10) Patent No.: US 7,679,887 B2
(45) Date of Patent: Mar. 16, 2010

(54) SWITCHING SYSTEM COMPRISING SWITCHGEAR THAT CAN BE CONTACTED VIA PIN CONTACTS

(75) Inventors: Robert Adunka, Sulzbach-Rosenberg (DE); Georg Bollinger, Schwarzhofen (DE); Johann Drexler, Schwandorf (DE); Berthold Heldmann, Freudenberg (DE); Eugen Mayer, Sulzbach-Rosenberg (DE)

(73) Assignee: Siemens Aktiengesellschaft, Munich (DE)

( * ) Notice: Subject to any disclaimer, the term of this patent is extended or adjusted under 35 U.S.C. 154(b) by 271 days.

(21) Appl. No.: 11/662,080

(22) PCT Filed: Aug. 31, 2005

(86) PCT No.: PCT/EP2005/054265

§ 371 (c)(1),
(2), (4) Date: Mar. 7, 2007

(87) PCT Pub. No.: WO2006/027326

PCT Pub. Date: Mar. 16, 2006

(65) Prior Publication Data

US 2008/0094784 A1 Apr. 24, 2008

(30) Foreign Application Priority Data

Sep. 8, 2004 (DE) .................. 10 2004 043 470

(51) Int. Cl.
*H02B 1/04* (2006.01)
(52) U.S. Cl. .................. 361/673; 361/647; 361/657; 200/50.02; 200/294

(58) Field of Classification Search ........... 361/641, 361/644, 646–647, 651–652, 657–658, 673; 200/50.01–50.02, 294
See application file for complete search history.

(56) References Cited

U.S. PATENT DOCUMENTS

| 4,351,620 | A | * | 9/1982 | Stritt et al. ................. 403/13 |
| 4,742,608 | A | * | 5/1988 | M'Sadoques et al. ........ 29/453 |
| 4,742,808 | A | | 5/1988 | Blümel et al. |
| 4,878,859 | A | * | 11/1989 | Haller et al. ............... 439/716 |
| 5,392,196 | A | * | 2/1995 | Kinner ..................... 361/809 |
| 5,880,927 | A | * | 3/1999 | Kent et al. ................. 361/634 |
| 6,224,429 | B1 | * | 5/2001 | Bernhards et al. .......... 439/709 |

(Continued)

FOREIGN PATENT DOCUMENTS

DE 26 34 199 A1 2/1978

(Continued)

OTHER PUBLICATIONS

English machine translation of DE2634199 (cited by applicant).*

(Continued)

*Primary Examiner*—Jayprakash N Gandhi
*Assistant Examiner*—Robert J Hoffberg
(74) *Attorney, Agent, or Firm*—Harness, Dickey & Pierce, P.L.C.

(57) ABSTRACT

A switching system includes switchgear that can be contacted via pin contacts. In at least one embodiment, the switching system is provided with pin contacts and mating pin contacts and at least one device(s) for the transmission of force onto the switchgear, thereby allowing to establish and interrupt contact to the switchgear even when only little space is available.

19 Claims, 9 Drawing Sheets

U.S. PATENT DOCUMENTS

| | | | |
|---|---|---|---|
| 6,293,820 B1 * | 9/2001 | Bechaz et al. | 439/532 |
| 6,454,614 B1 * | 9/2002 | Bechaz et al. | 439/532 |
| 2007/0263345 A1 * | 11/2007 | Adunka et al. | 361/633 |

FOREIGN PATENT DOCUMENTS

| | | |
|---|---|---|
| DE | 30 11 184 A1 | 10/1981 |
| DE | 691 29 824 T2 | 12/1998 |
| DE | 102 04 226 C1 | 4/2003 |
| EP | 0472409 B1 | 7/1998 |
| EP | 1 029 390 B1 | 9/2001 |
| JP | 04162326 A * | 6/1992 |
| JP | 08009517 A * | 1/1996 |
| JP | 2000067726 A * | 3/2000 |
| JP | 2000231867 A | 8/2000 |

OTHER PUBLICATIONS

English machine translation of DE10204226 (cited by applicant).*
English translation German Publication DE10204226C1.*
English Translation of Japanese Office Action dated Sep. 8, 2009 from the Japanese Patent Office for counterpart Japanese Application No. 2007-529357.

* cited by examiner

SWITCHING SYSTEM COMPRISING SWITCHGEAR THAT CAN BE CONTACTED VIA PIN CONTACTS

PRIORITY STATEMENT

This application is the national phase under 35 U.S.C. §371 of PCT International Application No. PCT/EP2005/054265 which has an International filing date of Aug. 31, 2005, which designated the United States of America and which claims priority on German Patent Application number 10 2004 043 470.0 filed Sep. 8, 2004, the entire contents of which are hereby incorporated herein by reference.

FIELD

Embodiments of the invention generally relate to a switching device including a switchgear unit. For example, it may relate to one which has at least one main current path with a switching element and connections for feeding the current into the main current path and for passing the current on from the main current path to a load.

BACKGROUND

Switching devices are used in a load branch, as is known from EP 1 029 390. Such a load branch includes a contactor and a circuit breaker. EP 1 029 390 has disclosed a branch assembly having an intermediate mount, on which the contactor and the circuit breaker are mounted. The intermediate mount is provided with a channel, in which plug contacts lie which are connected to the branch assembly for feeding the current via electrical lines.

SUMMARY

At least one embodiment of the invention provides a switching device in which contact can be made with the switchgear unit and interrupted in a simple manner via its connections. This should also be possible under restricted spatial conditions, i.e. when the switchgear unit is arranged tightly adjacent to further switchgear units.

In this case, making contact is facilitated even under restricted spatial conditions owing to the plug contacts which are accessible from the outside and can be plugged at right angles to the rear wall of the housing. Additional devices for transmitting force onto the switchgear unit or onto the mating plug contacts make it easily possible to eliminate the contact connection.

A particularly advantageous embodiment arises when a movable fixing element is provided on a mount which is used for fixing the switchgear unit, for which purpose the movable fixing means engages at least one contour of the switchgear unit or the holding device. This embodiment makes it possible to fit the switchgear unit in a simple manner by attaching it in the direction which is at right angles to the rear wall.

If the movable fixing element has at least one edge or disengaging face, via which the switchgear unit can be disengaged owing to a movement of the fixing element, it is thereby easily possible for the switchgear unit to be released from the fixing element.

The embodiment shown in FIG. 5 provides the opportunity of at the same time eliminating the fixing and the contact connection with the aid of the movable fixing element.

BRIEF DESCRIPTION OF THE DRAWINGS

Example embodiments of the invention will be explained in more detail below with reference to the drawings, in which.

DETAILED DESCRIPTION OF THE EXAMPLE EMBODIMENTS

Figure 1:
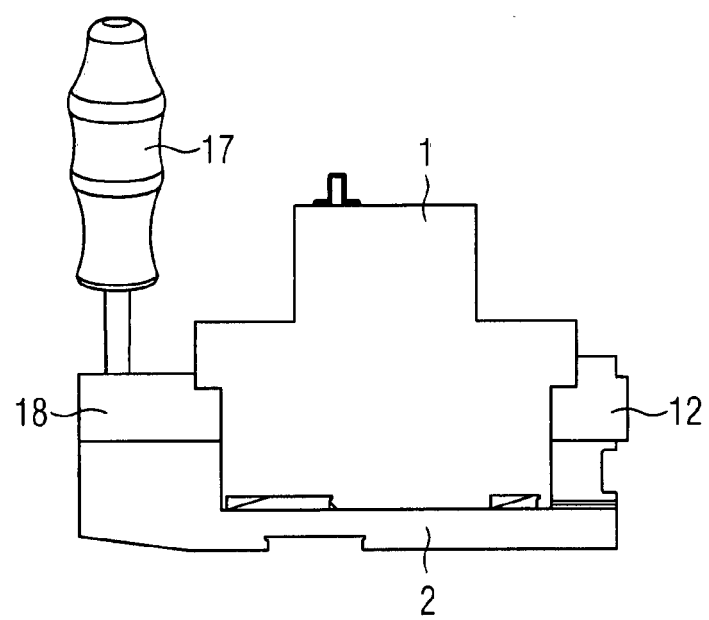
FIGS. 1, 2, 3 show a switching device according to an embodiment of the invention in the fitted and contact-connected state of a switchgear unit on a mount.
Figure 2:
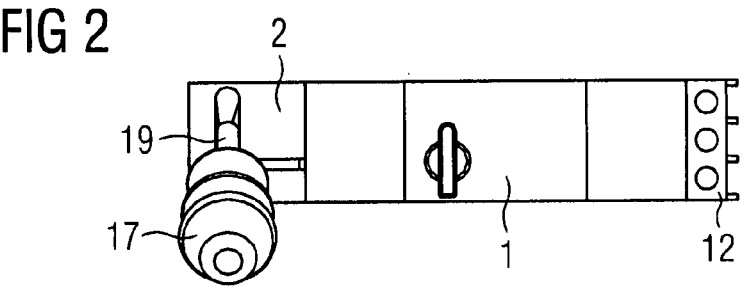
Figure 3:
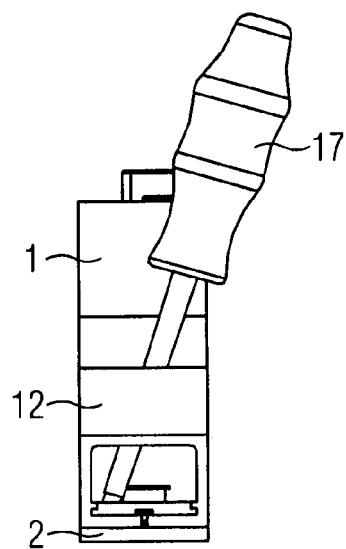

FIGS. 1, 2 and 3 illustrate a switching device, which essentially comprises a plug-contactable switchgear unit 1 and a mount 2, in the fitted and contact-connected state. The mount 2 is in the form of a U and accommodates the switchgear unit 1 in the intermediate space formed by the U shape, the switchgear unit 1 being fixed by a movable fixing device integrated in the mount 2.

Figure 4:
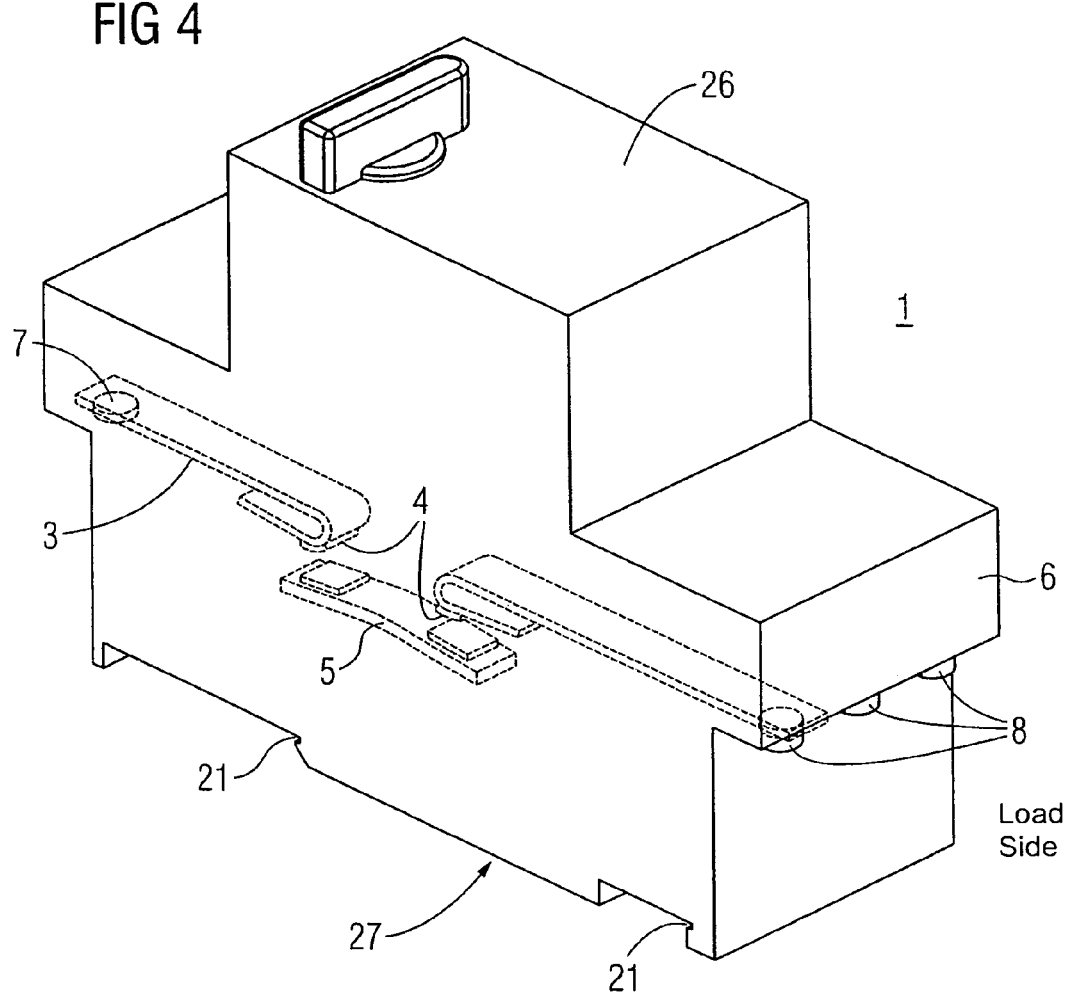
FIG. 4 shows a plug-contactable switchgear unit as shown in FIGS. 1, 2 and 3.

The switchgear unit 1 has a three-phase configuration with three main current paths 3, which are each provided with a switching element, as illustrated in FIG. 4, for example. The switching element in the main current path 3 includes, for example, a double-break configuration with two fixed contacts 4 and a movable contact link 5, by which the current conducted in the main current path 3 can be switched on and off. The housing 6 has plug contacts which are accessible from the outside and of which first plug contacts 7 are used for feeding the current into the main current path and second plug contacts 8 are used for passing the current on from the main current path 3 to a load. The first and second plug contacts are in this case in the form of contact pins 7, 8. The contact pins 7, 8 are accessible at right angles to the rear wall 27 of the housing 6 such that the plug connection between the plug contacts 7, 8 and the mating plug contacts is possible by one being inserted in the other essentially at right angles to the rear wall 27. The rear wall 27 is in this case the wall which is opposite the front side 26 and via which the switchgear unit 1 can generally be fixed.

Figure 5:
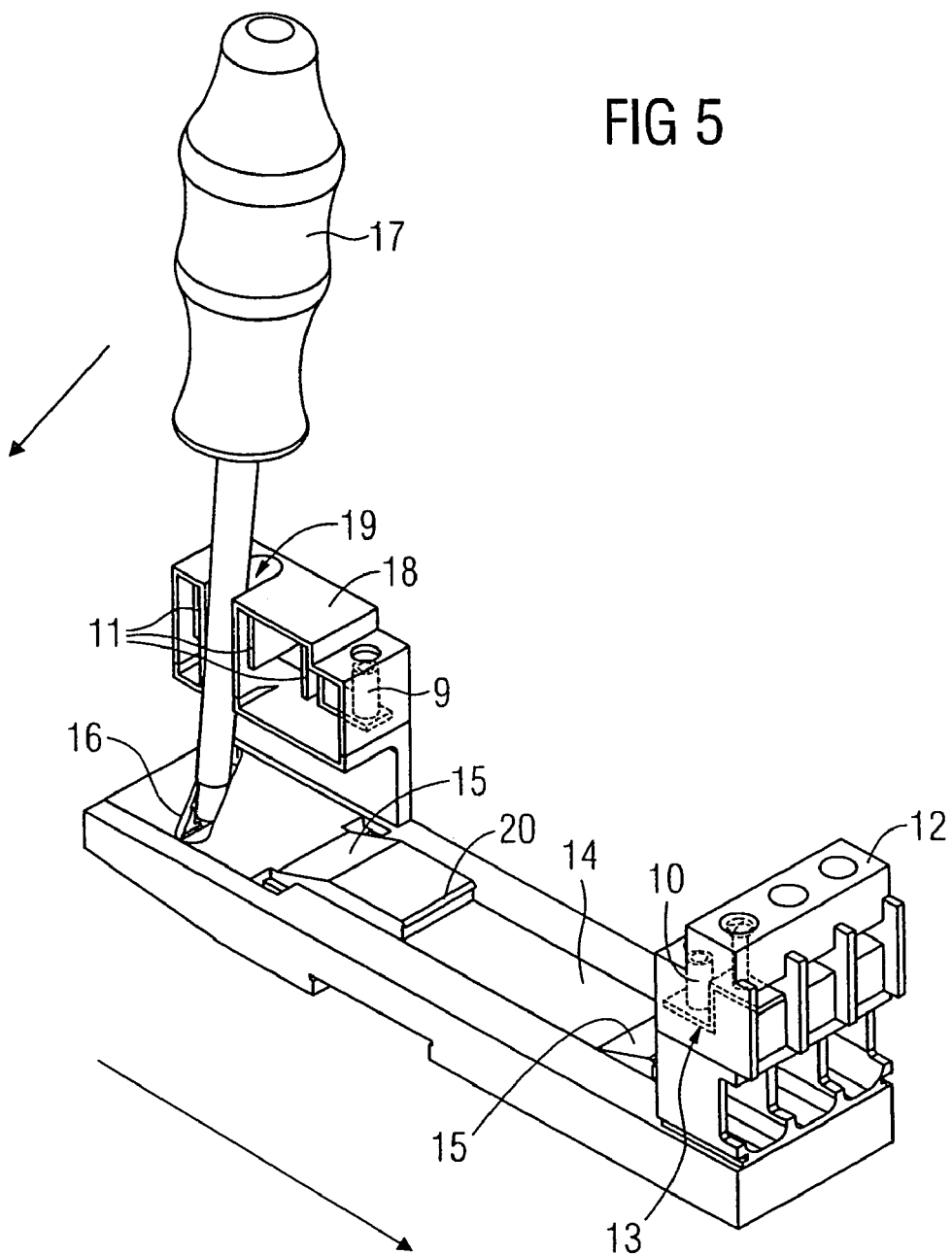
FIG. 5 shows a perspective view of a mount of the switching device according to an embodiment of the invention in an intermediate position of a slide for fixing purposes.

Mating plug contacts 9 and 10 for making contact with the contact pins 7, 8 are arranged in the limbs of the mount 2, as is shown in FIG. 5, for example. The mating plug contacts 9 are in this case electrically connected to busbars 11, which are routed insulated in a limb, for power supply purposes. The other limb has a removable plug connection module 12 having the mating plug contacts 10, which are each connected to a screw connection terminal 13 in the plug connection module 12. The screw connection terminals 13 are used for connecting lines for the purpose of supplying power to a load. A slide 14 is integrated as a movable fixing means in the mount, which slide is spring-loaded and is provided with two disengaging faces 15, which are at an angle of less than 45° with respect to the movement direction of the slide 14.

Furthermore, the slide 14 is provided with an actuating groove 16 for accommodating a tool, in particular a screwdriver 17, via which a force can be transmitted onto the slide 14 in order to displace it. The alignment of the actuating groove 16 has a component which is transverse with respect to the displacement or movement direction. The limb of the mount 2 which is also used as a supporting part 18 is provided with a through-opening 19, which is used for supporting the screwdriver 17.

Once the screwdriver 17 has been pushed through the through-opening 19 and engages in the actuating groove 16, a force can be transmitted by it onto the slide 14 by way of a lever movement, and this force displaces the slide transversely with respect to the lever movement. The displacement of the slide 14 on the one hand results in two hooks 20, which are integrally formed on the slide 14 and, in the mounted state, engage at a contour 21 (see FIG. 4) on the rear wall 27 of the housing 6, releasing the switchgear unit 1. At the same time, the oblique disengaging faces 15 of the slide 14 disengage the switchgear unit 1 upwards at right angles to the displacement direction, the contact connection between the contact pins 7, 8 and the mating plug contacts 9, 10 being eliminated.

Figure 6:
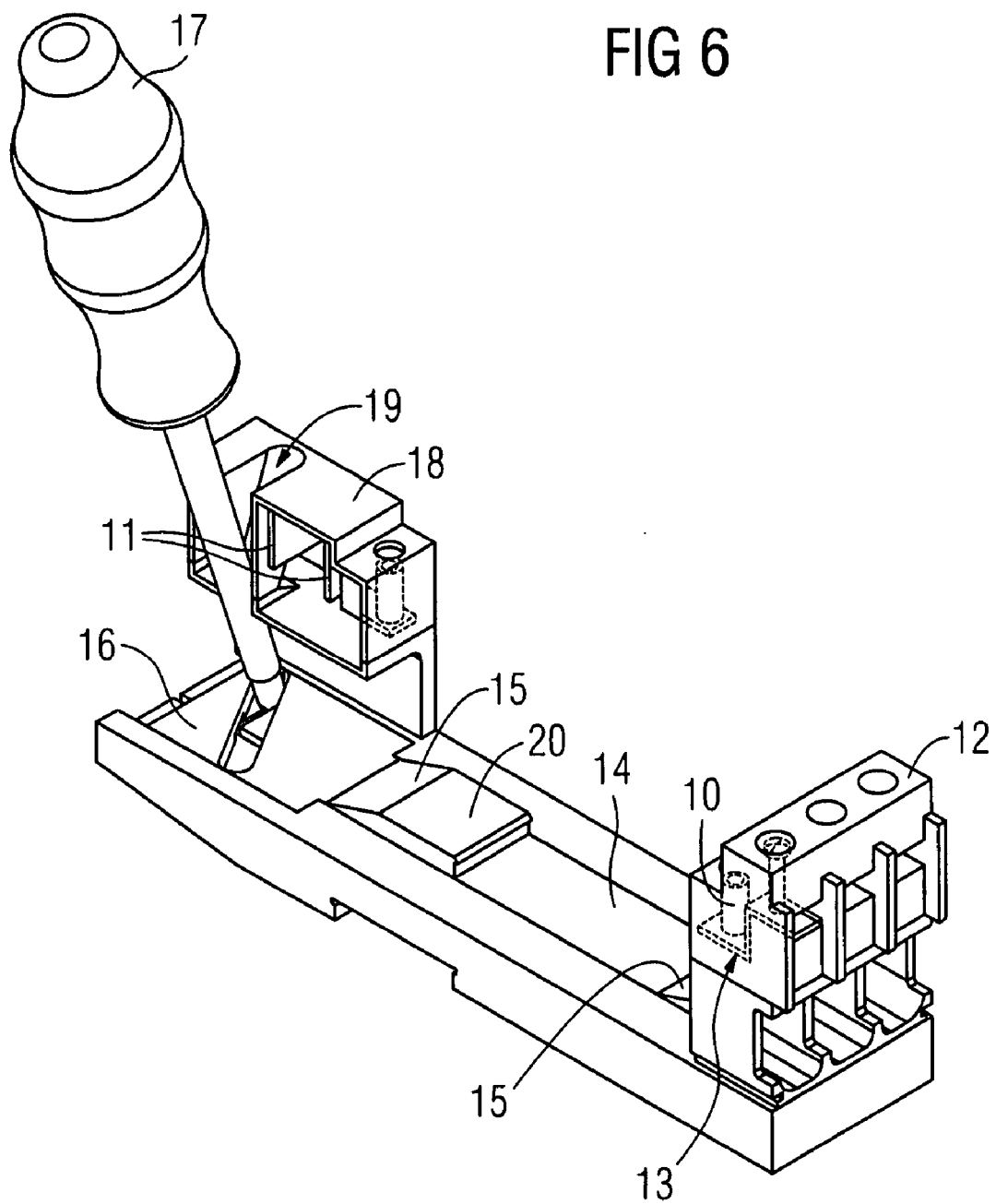
FIG. 6 shows a perspective view of the mount shown in FIG. 5 with a rest position of the slide located in the fitted state.
Figure 7:
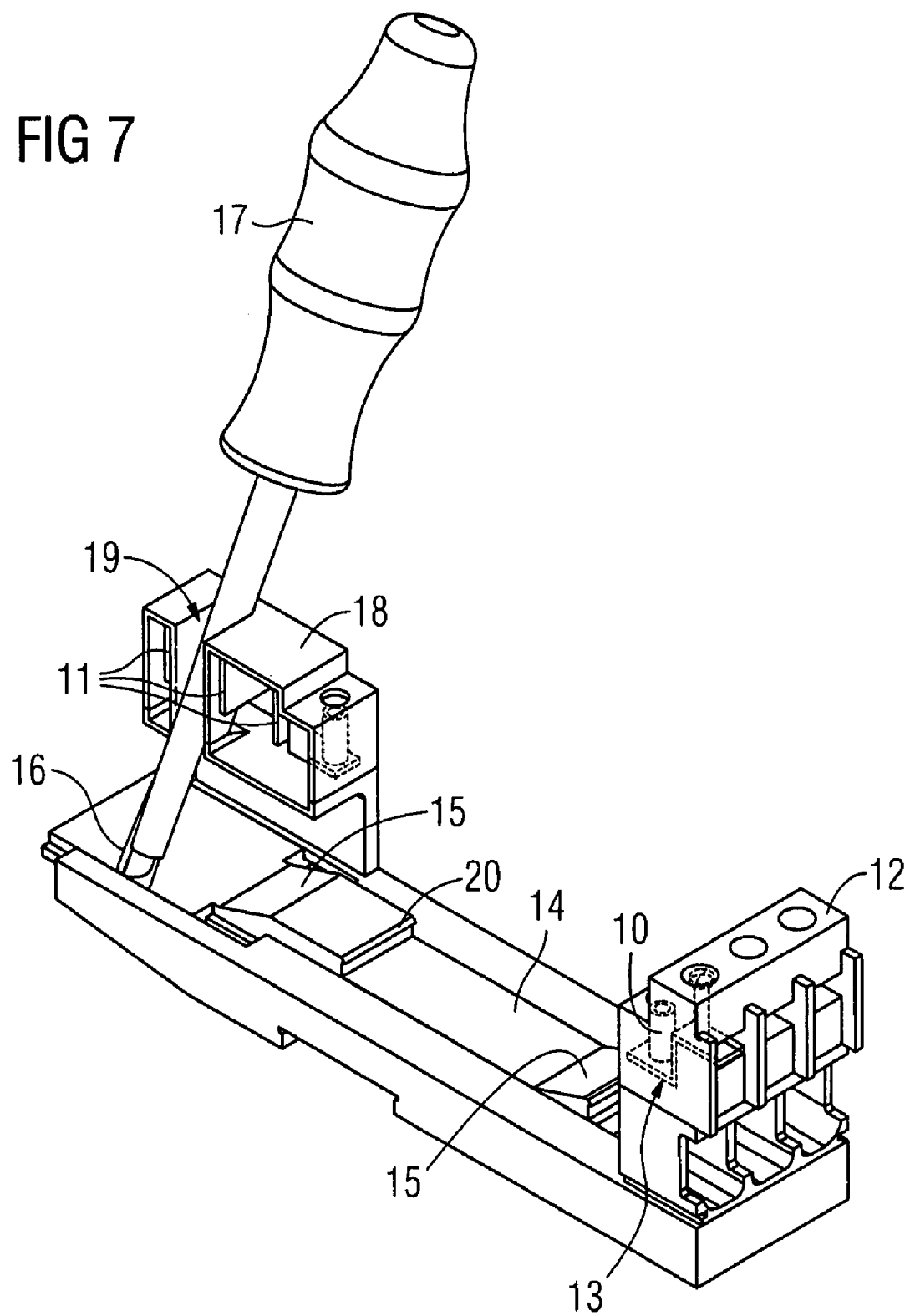
FIG. 7 shows a perspective view of a mount with a slide in the unfitted, i.e. disengaged state of the switchgear unit.
Figure 8:
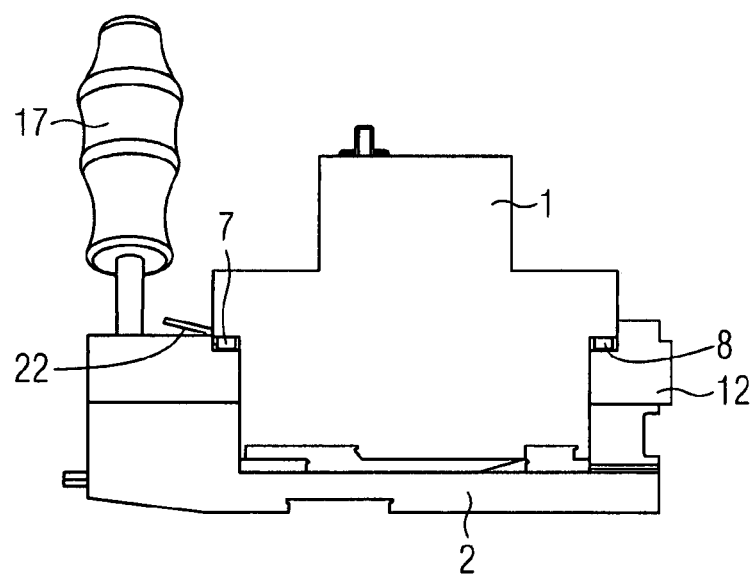
FIGS. 8, 9, 10 show various views of the switching device according to the invention shown in FIGS. 1, 2 and 3 in the case of a disengaged switchgear unit.
Figure 9:
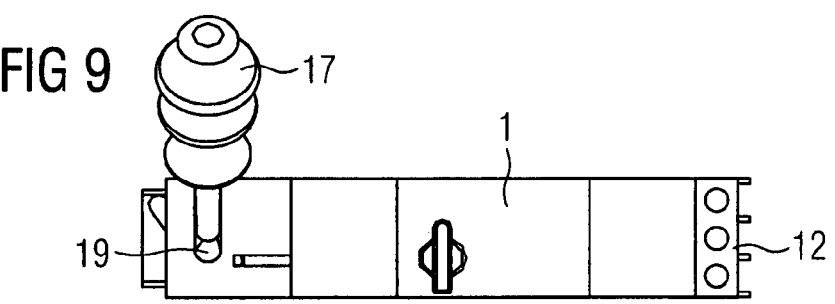
Figure 10:
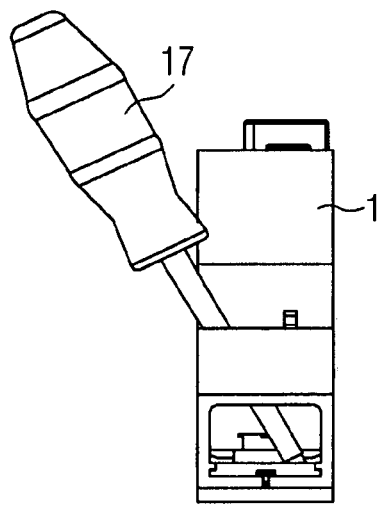

FIGS. 6, 5 and 7 show, in the sequence given, the change in the position of the slide 14 owing to the lever force of the screwdriver 17, starting from the position in the fitted state shown in FIG. 6 and the position in the final state with the disengaged switchgear unit 1 shown in FIG. 7. The switching device according to the invention with the disengaged switchgear unit 1, i.e. with the unfixed and non-contact-connected switchgear unit 1, is illustrated in FIGS. 8, 9 and 10. The switching device is provided with a display 22 of the contact-making state.

As shown in FIGS. 1, 2 and 3, the slide 14 is located in a preferred position in which it secures the switchgear unit 1 against becoming disengaged owing to a force-fitting and/or interlocking connection with it.

Alternative embodiments are described below.

Figure 11:
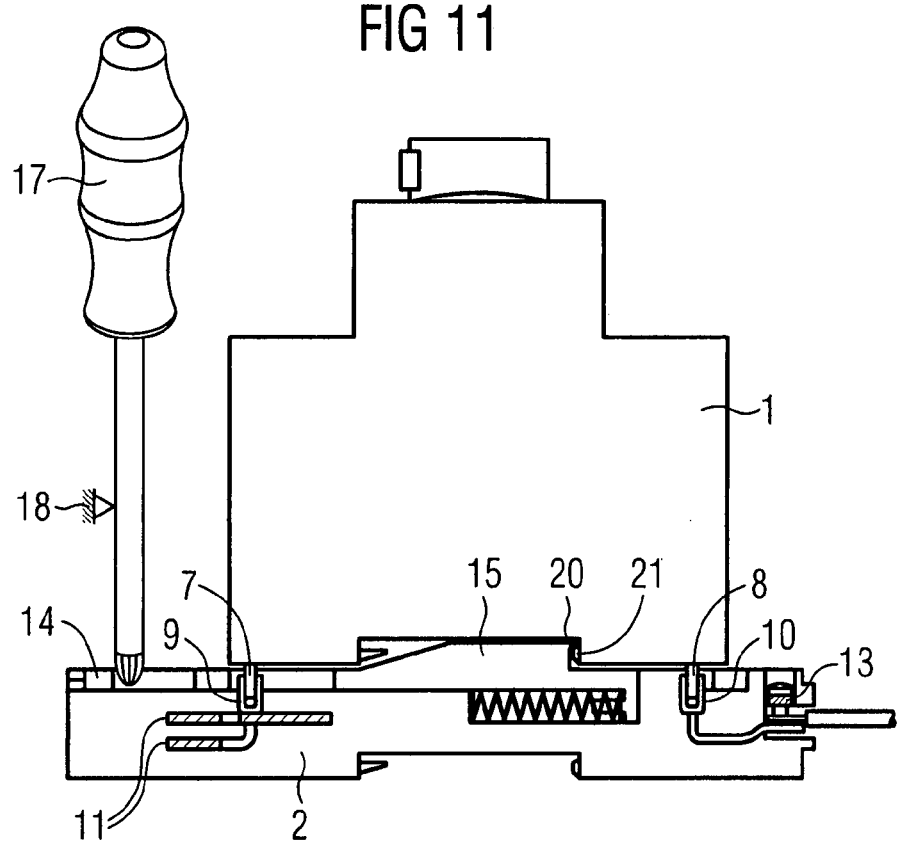
FIG. 11 shows a switching device according to the invention having an essentially plate-shaped mount.

FIG. 11 shows a mount 2 having a plug-contacted switchgear unit 1. In principle, this switching device has an identical design to the exemplary embodiment described above, but in this case the force is transmitted from the screwdriver 17 onto the slide 14 via a supporting part 18 having a different design.

Figure 12:
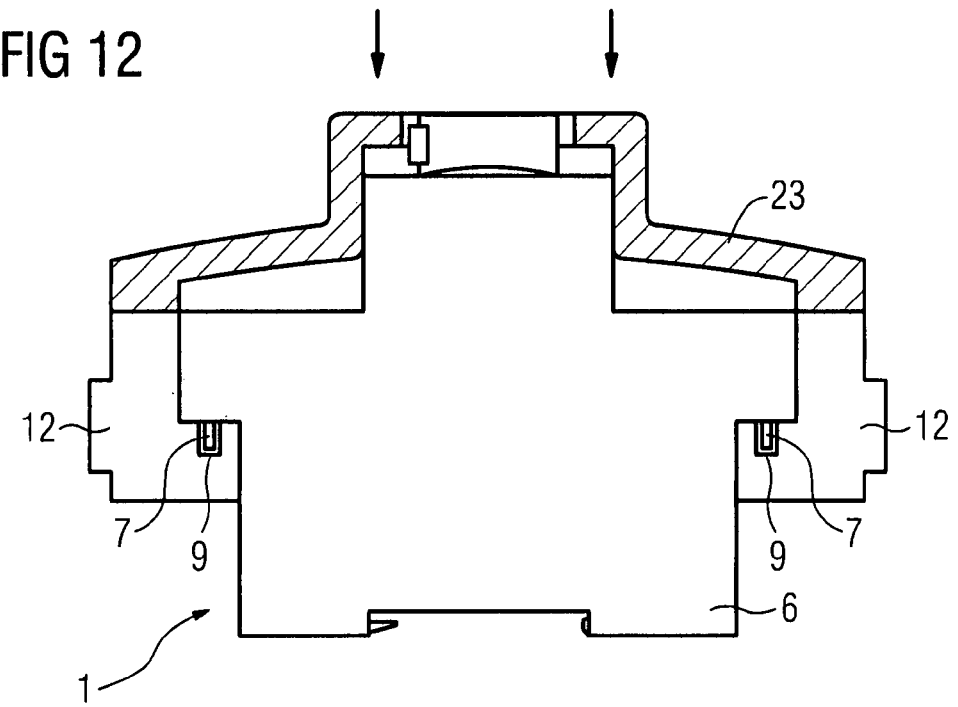
FIG. 12 shows a switching device having an alternative embodiment for eliminating the contact connection.

In the embodiment shown in FIG. 12, the switchgear unit 1, which can be snapped onto a top-hat rail, is plug-contacted with two plug connection modules 12 in the manner described above. A transmission of force onto the plug connection modules 12 and therefore the mating plug contacts 9, 10 can be achieved by way of a clip 23, which bears against the housing 6 and is guided by it, which results in the elimination of the contact-connected state. This can take place in the fixed state of the switchgear unit.

Helical springs can also be used as at least one device(s) for transmitting force onto the switchgear unit in order to eliminate the contact connection between the plug contacts and the mating plug contacts. After an unlatching operation, in which the fixing of the switchgear unit in the mount is eliminated, the helical springs push the switchgear unit out of the contact-making position. Various solutions are possible for the unlatching operation and the simultaneous or subsequent elimination of the contact connection.

Figure 13:
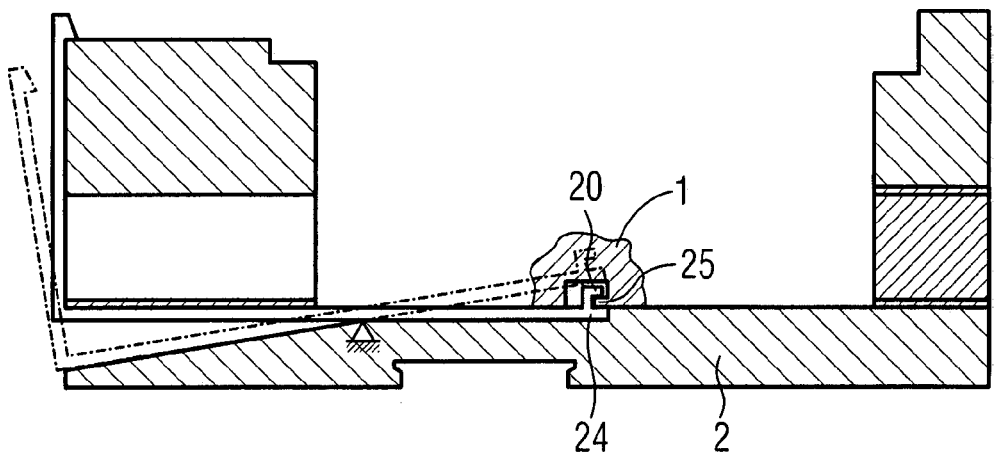
FIG. 13 shows a sectional illustration of a mount with an integrated movable fixing means in an alternative embodiment.

FIG. 13 illustrates an embodiment in which, as a deviation from the abovementioned example embodiment shown in FIGS. 1 to 10, the movable fixing element is illustrated as a pivotable lever 24. The lever 24 is provided with a hook 20 for latching with a projection 25 of the switchgear unit 1. By pivoting the lever 24, the latching is eliminated and the switchgear unit 1 is disengaged by way of a tipping movement.

Figure 14:
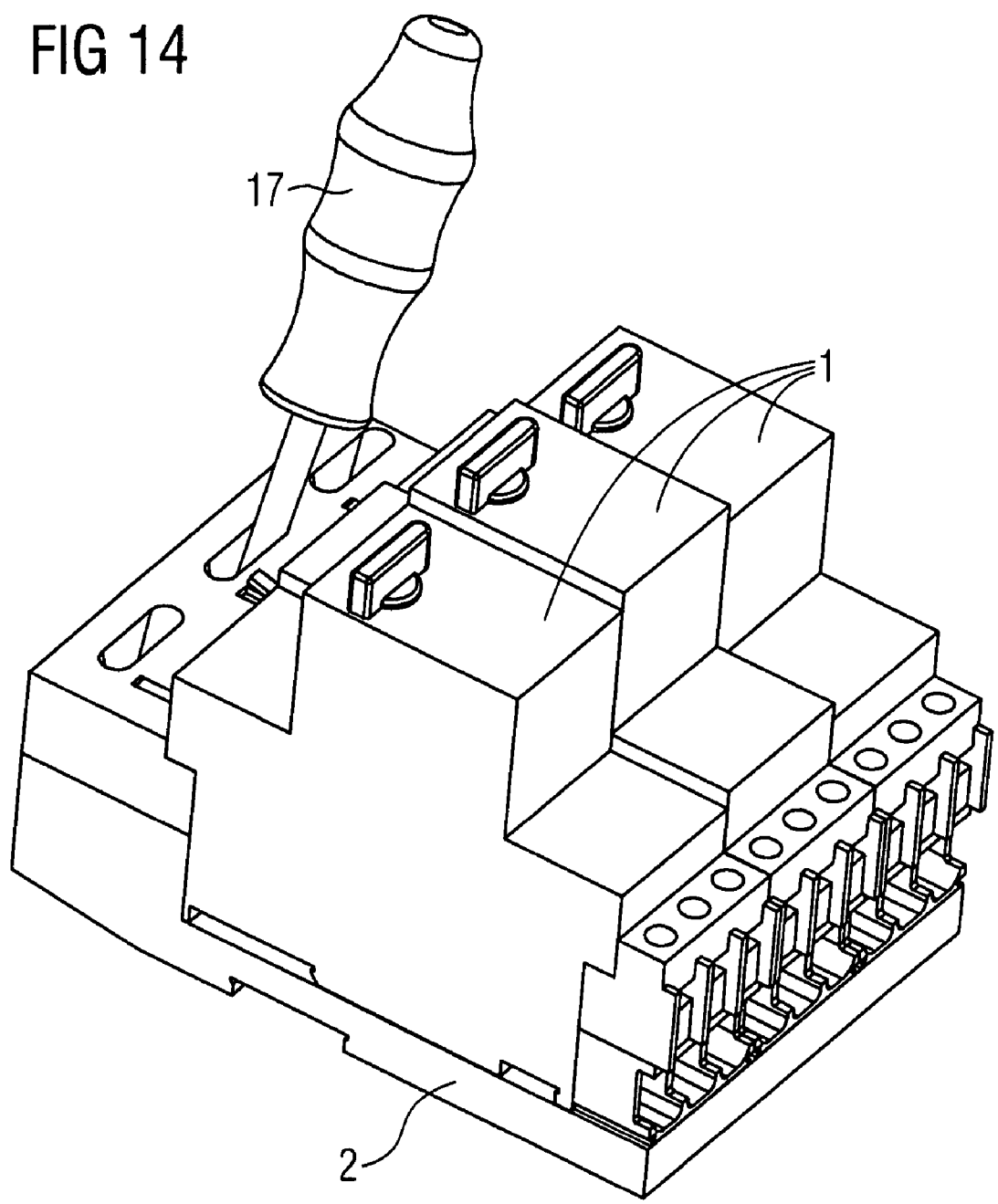
FIG. 14 shows a perspective view of a plurality of switchgear units fitted on a mount.

FIG. 14 shows three adjacent plug-contactable switchgear units 1 on a common mount 2 of the above described type, the two outer switchgear units 1 being in the fitted and contact-connected state. The central switchgear unit 1 is in the disengaged state owing to the actuation using the screwdriver 17.

Figure 15:
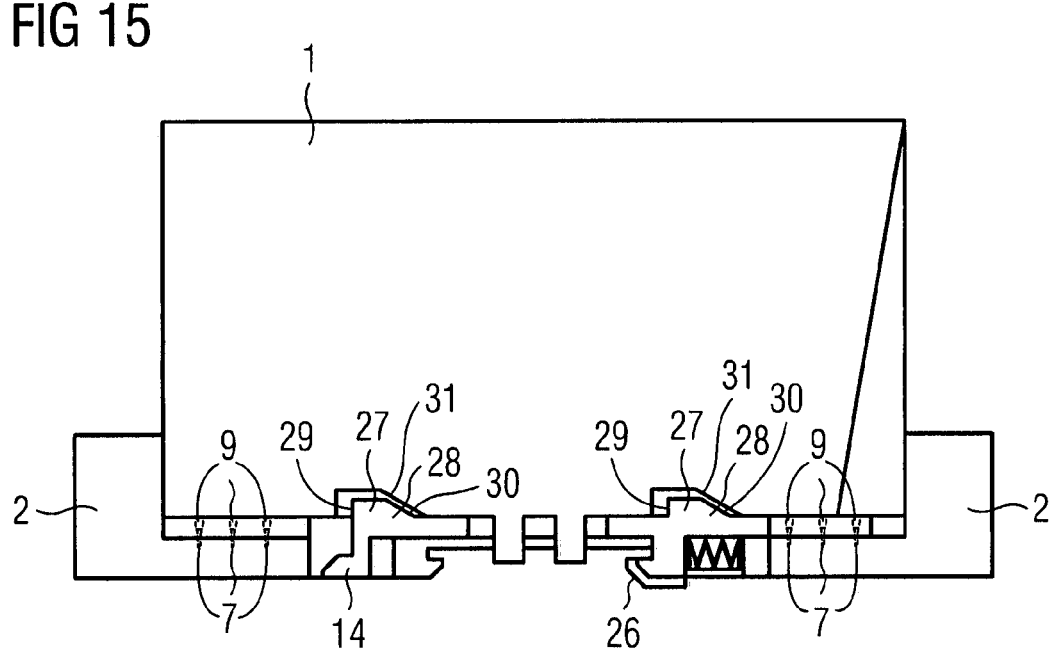
FIG. 15 shows an alternative embodiment of a switchgear unit with a mount for fixing it to a top-hat rail.

In the example embodiment shown in FIG. 15, a switchgear unit 1 is adapted by way of a slide 14 on a mount 2. The slide 14 is mounted in the mount 2 such that it can move and has a hook 28 for latching onto a top-hat rail on one side, onto which hook the mount 2 can also be snapped with its fixing device.

Two projections 29 of the slide 14 protrude with their oblique disengaging faces 30 into cutouts 31, which are matched in terms of shape, of the switchgear unit 1 on its lower side. Owing to the displacement of the slide 14, in a first phase of the displacement operation unlatching from the top-hat rail (not illustrated here) occurs. In the second phase of the displacement operation, the switchgear unit 1 is disengaged via the oblique disengaging faces 30 of the slide 14 and, in the process, the contact connection between the plug contacts 7, 8 of the switchgear unit 1 and the mating plug contacts 9, 10 in the mount 2 is eliminated at the same time.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A switching device, comprising:
at least one switchgear, including at least one main current path with a switching element and a housing with plug contacts, the plug contacts being accessible from the outside of the housing and protruding from the housing at right angles to a rear wall of the housing, at least one first plug contact being used for feeding a current into the at least one main current path and at least one second plug contact being used for passing the current from the at least one main current path to a load;
a mount for fixing the switchgear, the mount being disposed on the rear wall of the housing and including a movable fixing element configured to engage at least one contour formed on the rear wall of the housing to fix the switch gear to the mount;
at least one mating plug contact on the mount, the at least one mating plug contact being configured to make contact with at least one of the first plug contacts and the second plug contacts; and
a transmitting force element on the mount for transmitting force onto at least one of the switchgear and the mating plug contacts, the transmitting force element being configured to eliminate a contact connection between at least one of the first plug contacts and second plug contacts, and the at least one mating plug contact.

2. The switching device as claimed in claim 1, wherein the movable fixing element is configured to secure the switchgear against becoming disengaged owing to at least one of a force-fitting and interlocking connection between the movable fixing element and the switchgear.

3. The switching device as claimed in claim 2, wherein the movable fixing element includes at least one edge or disengaging face, via which the switchgear is disengageable owing to a movement of the fixing element.

4. The switching device as claimed in claim 2, wherein the movable fixing element is configured to transmit a force onto at least one of the switchgear and the at least one mating plug contact, which is used for eliminating a contact connection between at least one of the first plug contacts and the second plug contacts, and the at least one mating plug contact.

5. The switching device as claimed in claim 2, wherein the movable fixing element is in the form of a slide.

6. The switching device as claimed in claim 5, wherein a disengaging face of the slide is at an angle of less than 45° with respect to a movement of a direction of the slide.

7. The switching device as claimed in claim 5, wherein the slide includes an actuating groove for accommodating a tool, whereby a force is transmittable onto the slide from the switchgear in order to displace the slide.

8. The switching device as claimed in claim 2, wherein the movable fixing element is in the form of a lever, pivotable in one plane and including a hook for latching with a projection of the switchgear, and wherein the lever is actuatable to disengage the switchgear unit from the mount.

9. The switching device as claimed in claim 1, wherein the movable fixing element includes at least one edge or disengaging face, via which the switchgear is disengageable owing to a movement of the fixing element.

10. The switching device as claimed in claim 1, wherein the movable fixing element is configured to transmit a force onto at least one of the switchgear and the at least one mating plug contact, which is used for eliminating a contact connection between at least one of the first plug contacts and the second plug contacts, and the at least one mating plug contact.

11. The switching device as claimed in claim 1, wherein the movable fixing element is in the form of a slide.

12. The switching device as claimed in claim 11, wherein a disengaging face of the slide is at an angle of less than 45° with respect to a movement of a direction of the slide.

13. The switching device as claimed in claim 12, wherein the slide includes an actuating groove for accommodating a tool, whereby a force is transmittable onto the slide in order to displace the slide from the switchgear.

14. The switching device as claimed in claim 11, wherein the slide includes an actuating groove for accommodating a tool, whereby a force is transmittable onto the slide in order to displace the slide from the switchgear.

15. The switching device as claimed in claim 14, wherein an alignment of the actuating groove includes a component which is transverse with respect to a displacement direction.

16. The switching device as claimed in claim 15, further comprising a supporting part including a through-opening, for supporting the tool with which the force is transmittable onto the slide with a lever movement of the tool engaging in the actuating groove.

17. The switching device as claimed in claim 14, further comprising a supporting part including a through-opening, for supporting the tool with which the force is transmittable onto the slide with a lever movement of the tool engaging in the actuating groove.

18. The switching device as claimed in claim 1, wherein the movable fixing element is in the form of a lever, pivotable in one plane and including a hook for latching with a projection of the switchgear, and wherein the lever is actuatable to disengage the switchgear from the mount.

19. A switching device, comprising: at least one switchgear, including at least one main current path with a switching element and a housing with plug contacts, the plug contacts being accessible from the outside of the housing and capable of being plugged at right angles to a rear wall of the housing, at least one first plug contact being used for feeding a current into the at least one main current path and at least one second plug contact being used for passing the current from the at least one main current path to a load; at least one of mating plug contacts for making contact with at least one of the first plug contacts and the second plug contacts; means for transmitting force onto at least one of the switchgear and the at least one of the mating plug contacts, the means for transmitting being used for eliminating a contact connection between at least one of the first plug contacts and second plug contacts, and the at least one of the mating plug contacts; and a movable fixing element on a mount for fixing the switchgear, the movable fixing element being in the form of a slide and engaging at least one contour of the switchgear to fix the switchgear, wherein the slide includes an actuating groove for accommodating a tool, whereby a force is transmittable onto the slide to displace the slide.

* * * * *